March 20, 1945.　　　　L. J. COLLINS　　　　2,371,607
TORQUE APPLYING DEVICE
Filed Dec. 11, 1941
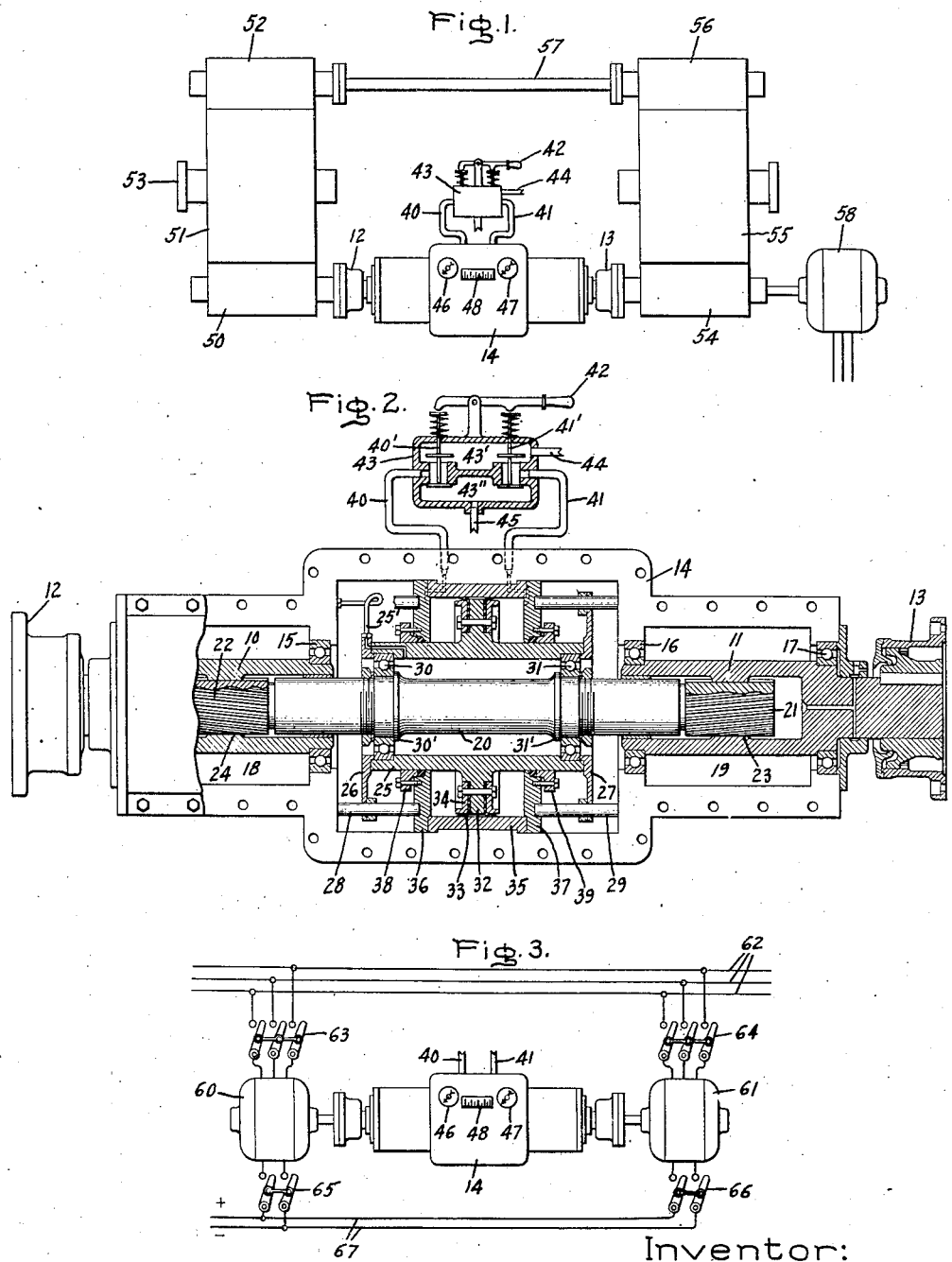
Inventor:
Laurence J. Collins,
by Harry E. Dunham
His Attorney.

Patented Mar. 20, 1945

2,371,607

UNITED STATES PATENT OFFICE 2,371,607

TORQUE APPLYING DEVICE

Laurence J. Collins, Marblehead, Mass., assignor to General Electric Company, a corporation of New York Application December 11, 1941, Serial No. 422,548

4 Claims. (Cl. 64—24)

My invention relates to torque applying devices and more particularly to a torque applying device for loading gears during test operations.

One object of my invention is to provide a device whereby a predetermined torque may be applied or a phase displacement may be effected between two rotating members.

Another object of my invention is to provide a device operable to effect a loading of gear trains connected together for testing purposes and rotated at operating speeds.

For a better understanding of my invention, together with other and further objects thereof, reference is had to the following description taken in connection with the accompanying drawing, and its scope will be pointed out in the appended claims.

In the accompanying drawing, Fig. 1 is a diagrammatic illustration of my device applied to a gear train; Fig. 2 is a cross sectional elevation through the axis of the torque applying device; and Fig. 3 is a diagrammatic illustration of my device applied to the testing of synchronous motors.

Referring to the drawing in detail and specifically to Fig. 2, my device comprises a pair of coupling shafts 10 and 11 provided respectively with suitable couplings 12 and 13 mounted in a casing 14 for rotation about a common axis at opposite ends of the casing 14. The shaft 10 is mounted in ball bearings 15 only one of which is shown, and the shaft 11 is mounted in ball bearings 16 and 17. The casing 14 is divided into three compartments, the outer compartments 18 and 19 enclosing the shafts 10 and 11 together with their bearings, and the center compartment enclosing an intermediate shaft 20 which is mounted coaxially with the shafts 10 and 11 and which projects into the shafts, the latter being made hollow for the greater part of their length for this purpose. Shaft 20 is provided on its respective ends with helical splines 21 and 22. The splines 21 project into the shaft 11, to interlock with splines 23 on the inner surface of the hollowed part of the shaft 11. These splines 23 extend over only a portion of the inner surface and are shorter than the splines 21 being normally centrally positioned with respect to the longer splines 21 on the shaft 20. The splines 22 project into the hollow portion of the shaft 10, which hollow portion is provided with splines 24 cooperating with the helical splines of the shaft 20. These splines 24 are also shorter than the shaft splines 22 and are normally located centrally with respect to these longer splines. An axial motion of the shaft 20 provides a displacement of the shafts 10 and 11 in opposite directions by an angular distance proportional to the axial movement of the shaft 20 and to the pitch of the helices of the splines. In order to effect such axial movement, the shaft 20 is mounted in a cradle comprising a cylindrical member 25 closed by end members 26 and 27, which end members are supported by and are slidable along suitably spaced bars 28 and 29 respectively, the bars being supported by the walls of the casing 14. A suitable number of bars 28 support the end member 26 and a suitable number of members 29 are used to support the end member 27. Ball bearings 30 and 31 are placed within the cylindrical member for supporting the shaft 20. Lubricant is supplied to these bearings through a flexible tube 25' connected between the casing 14 and the member 26. The cylindrical member 25 is provided, on its outer surface, with a flange 32 which is provided with suitable packing rings 33 bolted to the flange by rings 34 so as to form a piston slidable within a cylinder lining 35 mounted rigidly on the walls of the center compartment of the casing 14. This cylinder is closed by the end members 36 and 37, suitable packings 38 and 39 being provided between these members and the cylindrical member 25 to form air-tight compartments on the opposite sides of the piston flange 32. Fluid conduits 40 and 41 are provided to admit fluid on the respective sides of the piston to effect a movement of that piston within the cylinder 35 and thereby effect the movement of the cradle including the cylindrical member 25 and its end members 26 and 27. The shaft 20 being mounted in this cradle is provided with suitable flanges 30' and 31' which press against the bearings and the end members, thereby to force the shaft to move axially with the cradle. This movement of the shaft 20 effects a movement of the two shafts 10 and 11 opposite to each other and about the common axis. Fluid is admitted to the opposite ends of the cylinder formed by members 35, 36, 37 through the conduits 40 and 41. Any suitable valve arrangement may be used for this purpose. In the described apparatus suitable spring seated valves 40' and 41' operable by a single pivoted lever 42 are diagrammatically illustrated. The valves are seated in a valve chest 43 which is divided into two compartments 43' and 43''. The valves normally connect conduits 40 and 41 to the compartment 43' which is exhausted through a conduit 44. The lower compartment 43'' is supplied with fluid under pressure by a conduit 45. An upward movement of the handle end of the operating lever 42 depresses the valve 40' to admit fluid from the compartment 43" to the conduit 40 and to shut off the connection between the exhaust compartment 43' and the conduit 40. A depression of the handle end of the lever 42 releases the valve 40' to return to its normal position and depresses the valve 41' to connect the conduit 41 to the chamber 43" and close it off from the chamber 43'. Both valves 40' and 41' are normally in position to exhaust the conduits 40 and 41. Suitable pressure indicating gages 46 and 47 indicate the fluid pressure within the cylinder which is effecting the displacement of the piston and an additional indicator 48 indicates the distance of travel of the piston.

Fig. 1 illustrates the application of this device to two trains of gears which are connected, for testing purposes, into a single gear train and are rotated at operating speeds by a suitable motor. The gear trains are of the type used between the prime mover and the propeller shaft of a ship. The one train of gears comprising a pinion 50, a gear 51 and a second pinion 52 is of the type in which two prime movers are connected respectively to the pinions to drive the center gear 51, which, through its coupling 53, is connected to the propeller shaft. In the present instance a second gear train similarly comprising a pinion 54, gear 55 and a second pinion 56 is connected to the first gear train through a shaft 57 connected between the pinions 52 and 56. The couplings 12 and 13 of my torque applying device are connected between the pinions 50 and 54, and a motor 58 is applied to drive the entire assembly. It is known that a gear train, when under load and not moving, displaces its lubricating films to such an extent that it requires two or three times as great a force to start the gears turning as it takes to maintain the gears rotating after the lubricating film is again established. It is desirable, therefore, for testing purposes, to obtain some means of loading the gears or applying the torque, which these gears must exert during operation, after the gears have been started turning. With my device as above described the valves 40' and 41' are normally positioned to relieve the pressure on each side of the piston 32 thereby permitting the shaft 20 to take an intermediate position and the couplings to align themselves in such phase relation that no torque is applied to the gear train as above assembled. In starting, the normal friction is present and a minimum power is required of the motor 58 to start these gears. After the gears are in operation the valves are so manipulated that the piston will apply torque to the gears, this torque being calculated from the pressure of the fluid as indicated by the pressure gages on the device. It is possible by the mere manipulation of the valves to vary this pressure during the rotation of the gears and to reverse the torque, thereby to obtain accurate information on the behavior of these gears under operating conditions.

Fig. 3 illustrates another application of my device. In this instance two synchronous motors 60 and 61 are connected through suitable switches to a source of power indicated by the conductors 62. A closure of the switches 63 and 64 respectively furnishes alternating current to these motors and by closure of switches 65 and 66 direct current is applied to the fields of these motors from a direct current power source through the conductors 67. When these motors are operating and in step with the supply current, a phase displacement of these motors may be obtained by admitting pressure to one side of the piston 32. The effect of such phase displacement is to retard one motor and push the other ahead of its normal position in respect to the phase of the alternating current supplied thereto. This is the condition that exists between a motor which is supplying a mechanical load and a generator which is supplying current to the loaded motor. As a result of this phase displacement certain circulating currents are set up between the motor and the generator as above described, but no additional power is drawn from the source. The power being furnished by the source is only that which is required to overcome the friction and other losses obtained in devices of this sort, and thereby machines of this type may be economically tested.

Thus, with my invention I have accomplished an improved torque applying device for testing interconnected sets of gears and like rotatable elements or machines. Broadly, such device comprises three shafts, a first shaft, a second shaft, and a third shaft located between and aligned with the first and second shafts and connected thereto by helical spline means formed on adjacent ends of the shafts. The first and second shafts are rotatably supported and restrained from axial movement. The third shaft is likewise rotatably supported by a support which may be moved axially to effect axial movement of the third shaft and thereby to apply a torque to each of the first and second shafts. The means for supporting and axially moving the third shaft in a preferred embodiment as explained above includes an axially movable cylinder 25 with an outer flange 32 or, from another viewpoint, this cylinder and flange may be considered as a hollow sleeved piston 32 or a piston with a hollow stem concentrically surrounding the third shaft and supporting it through bearings 30 and 31, which latter engage shoulders on the third shaft to prevent relative axial movement between the piston and the third shaft. Annular chambers are formed on both sides of the piston for receiving fluid under pressure to displace the third shaft axially in either direction.

In the example described in connection with Fig. 1 the two sets of gears are interconnected by a rigid shaft 57. Therefore in this case as illustrated in Fig. 2 the helical splines 22, 24 and 21, 23 formed on the first and second shafts respectively are inclined in opposite directions so that upon axial displacement of the third shaft 20 the meshing teeth of the gears are forced against each other with a pressure depending upon the degree of axial displacement of the third shaft or the relative axial movement between the cooperating helical splines. If the third shaft is displaced in one direction, the teeth are forced against each other on one side and if the shaft is displaced in the opposite direction, opposite sides of the teeth are forced against each other. Upon rotation of the gears by the motor 58 in one direction one side of all teeth is tested and upon rotation of the gears in the opposite direction the other side is tested with a tooth pressure set up between the teeth which is the same as occurs during actual working conditions.

What I claim as new and desire to secure by Letters Patent of the United States is:

1. A torque applying device for testing interconnected gear sets and the like comprising a first shaft, a second shaft axially spaced from and aligned with the first shaft, means rotatably supporting said shafts and preventing axial movement thereof, a third shaft located between the first and second shafts, axially movable means for rotatably supporting the third shaft in alignment with the first and second shafts, cooperating helical splines formed on and connecting the ends of the third shaft with the adjacent ends of the first and second shafts, and means associated with said axially movable means for axially moving the third shaft to impose a torque on each of the first and second shafts.

2. A torque applying device comprising a first shaft with helical splines, a second shaft with helical splines, a third shaft having end portions with helical splines in cooperation with the helical splines of the first and second shafts respectively to transmit torque between the shafts, means rotatably supporting the shafts, means restraining the first and second shafts from axial movement, means for axially moving the third shaft in either direction to impose torques on the first and second shafts, said means comprising a piston with a hollow stem surrounding the third shaft, fluid chambers formed on both sides of the piston, and means for conducting fluid under pressure to either of said chambers.

3. A torque applying device for testing interconnected gear sets and the like comprising a casing forming an intermediate chamber and end chambers in alignment with the intermediate chamber, two hollow shafts with internal helical splines supported in the end chambers and restrained from axial movement, a third shaft extending through all chambers and having end portions with helical splines in engagement with the corresponding splines of the first mentioned two shafts, means located in the intermediate chamber for rotatably supporting the third shaft, said supporting means comprising a hollow piston surrounding the shaft, and chambers formed in the intermediate chamber on both sides of the piston for receiving fluid under pressure to effect axial movement of the piston and the third shaft in order to impose torques on the first and second shafts.

4. A torque applying device for testing gear sets and like rotatable elements comprising a casing forming an intermediate chamber and an end chamber on each end of the intermediate chamber, a first and a second coupling shaft, means supporting each shaft on one of the end chambers and preventing axial movement of the shaft, a third shaft having a shoulder located in the intermediate chamber, helical spline means connecting each end of the third shaft to one end of the first and second shafts, means rotatably supporting the third shaft in alignment with the first and second shafts and permitting axial movement of the third shaft comprising a piston having a hollow stem concentrically spaced from the third shaft, a bearing secured in the hollow stem and engaging said shoulder, means axially guiding the hollow stem and preventing rotary movement thereof, and a power agency including chambers formed on each side of the piston for receiving fluid under pressure to axially move the piston together with the third shaft.

LAURENCE J. COLLINS.